Oct. 20, 1936.  H. E. PRUITT  2,058,351
TAP
Original Filed Dec. 1, 1934
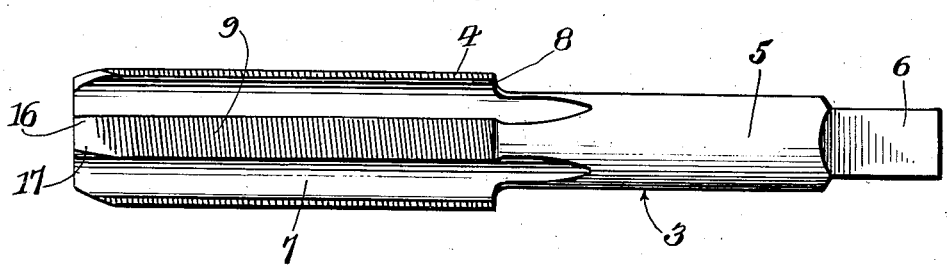
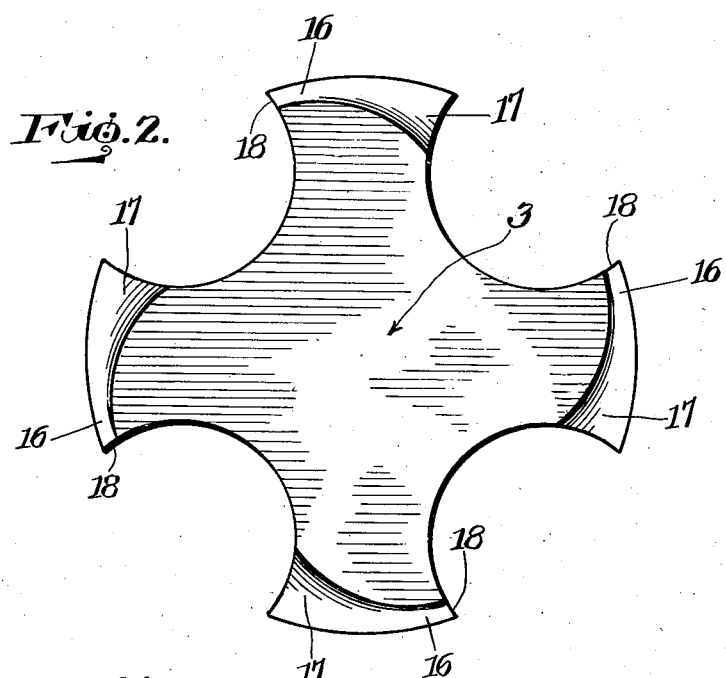
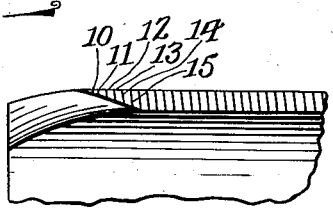
Inventor
Harvey E. Pruitt
By Geo. F. Kimmel
Attorney Patented Oct. 20, 1936

2,058,351

UNITED STATES PATENT OFFICE 2,058,351

TAP

Harvey E. Pruitt, Flint, Mich.

Application December 1, 1934, Serial No. 755,623
Renewed August 29, 1936

1 Claim. (Cl. 10—141)

This invention relates to a tap and has for its object to provide, in a manner as hereinafter set forth, a tool of such class so constructed for obtaining more free cutting and greater chip clearance, with respect to standard practice resulting thereby in greater efficiency in threading.

A further object of the invention is to provide, in a manner as hereinafter set forth, a tap having a spiral cutting edge and a pilot so formed whereby the tap, when used, promotes greater efficiency in threading due to two reasons, one, more free cutting and the other greater chip clearance with respect to standard practice.

To the above ends essentially, and to others which may hereinafter appear, the invention consists of such parts, and such combination of parts which fall within the scope of the invention as claimed.

In the drawing:

Figure 1 is a side elevation of the tap,

Figure 2 is a view looking towards the pilot end of the tap, and

Figure 3 is a fragmentary view of the tap in side elevation.

The tap, in accordance with this invention, is formed from a single length of stock 3 provided with a threader part 4 of circular cross section, a shank part 5 of cross sectional contour similar to that of part 4 and a polygonal shaped stem part 6 for connecting the tap to a driver therefor. The shank part 5 is interposed between and integral with parts 4, 5. The part 4 is of greater diameter than part 5. The latter is disposed concentrically with respect to the inner end of part 4.

The stock 3 is provided with lengthwise extending equi-distant spaced flutes 7 of semi-circular cross section. The flutes 7 extend from the outer end of part 4 to the forward portion of part 5. The flutes 6 provide the part 4 with equi-distant spaced lands 8. Each of the latter is formed upon its outer face with a group of thread cutting teeth 9 disposed transversely thereof. The teeth on one land align with the teeth upon an adjacent land. The teeth 9 extend from a point removed from the outer end of the land to the inner end of the latter. The length of the major number of the teeth of each group extend from one side to the other side of a land. Each group of teeth has its outer end formed with a series of teeth which progressively increase in length from the outer to the inner tooth of said series. With reference to Figure 3, the teeth of the series at the outer end of the group of teeth are designated 10, 11, 12, 13, 14, and 15. The teeth of each of said series extend from one side edge and terminate adjacent the other side edge of a land. The number of the teeth of each series may be increased or decreased if desired. The number of the teeth of each series will be the same.

The outer face of that portion of each land, which is clear of the teeth is chamfered. The chamfered portion is formed of two parts 16, 17. The outer end of the chamfered portion of each land is upon a smaller arc and smaller radius than that of the non-chamfered portion of the land. The part 16 extends from one side of the land for about two-fifths of the width of said portion. The part 16 is of uniform length and slopes downwardly in a uniform manner to the outer end of the land, the slope of part 16 being of convex curvature, in transverse and longitudinal section. The part 17 of said portion is of greater width than part 16. The slope of part 17 is greater than part 16, the slope of part 17 being of arcuate curvature in transverse and longitudinal sections. The chamfer is uniform for about two-fifths of that portion of the land free of the teeth and then drops abruptly to the finish point of grinding, or in other words, part 16 is upon an arc less than that of a cutting tooth for a distance of about two-fifths of the chamfer and the part 17 then drops abruptly to the finish point of grinding and is upon an arc less than that of said part 16. The part 17 is of greater length than part 16 and gradually increases in length from part 16 to the other side of the land. The tap is formed with cutting edges 18 substantially of segmental contour which extends from the outer end of the tap to that outer tooth of a group which extends from one side edge to the other side edge of a land. The tap has its pilot end formed with a large chip clearance due to the part 17 being of greater width and length and upon a smaller arc and smaller radius, both transversely and longitudinally, than that of part 16.

The construction of the entering or pilot end of the tap, in the manner as set forth, promotes for much greater efficiency in threading, with respect to standard taps, due to two reasons, namely, more free cutting and greater chip clearance.

What I claim is:

A tap having spaced sidewise opposed lands, the outer faces of said lands being of arcuate contour, each of said lands having a chamfered outer end portion having a cutting edge and a trailing edge and formed of a pair of sloping parts, each of said parts sloping transversely of the said outer end portion and longitudinally from its inner to its outer end, one of said parts adjacent the cutting edge being on a predetermined arc transversely and longitudinally and the other of said parts being upon a materially greater slope both transversely and longitudinally than that and abruptly sloping from the other of said parts toward the trailing edge, the outer end of said chamfered portion being upon a smaller arc and smaller radius than that of the non-chamfered portion of the land, and the said other of said parts being of a width corresponding substantially to three-fifths of the width of said chamfered portion.

HARVEY E. PRUITT.